Figure 1:
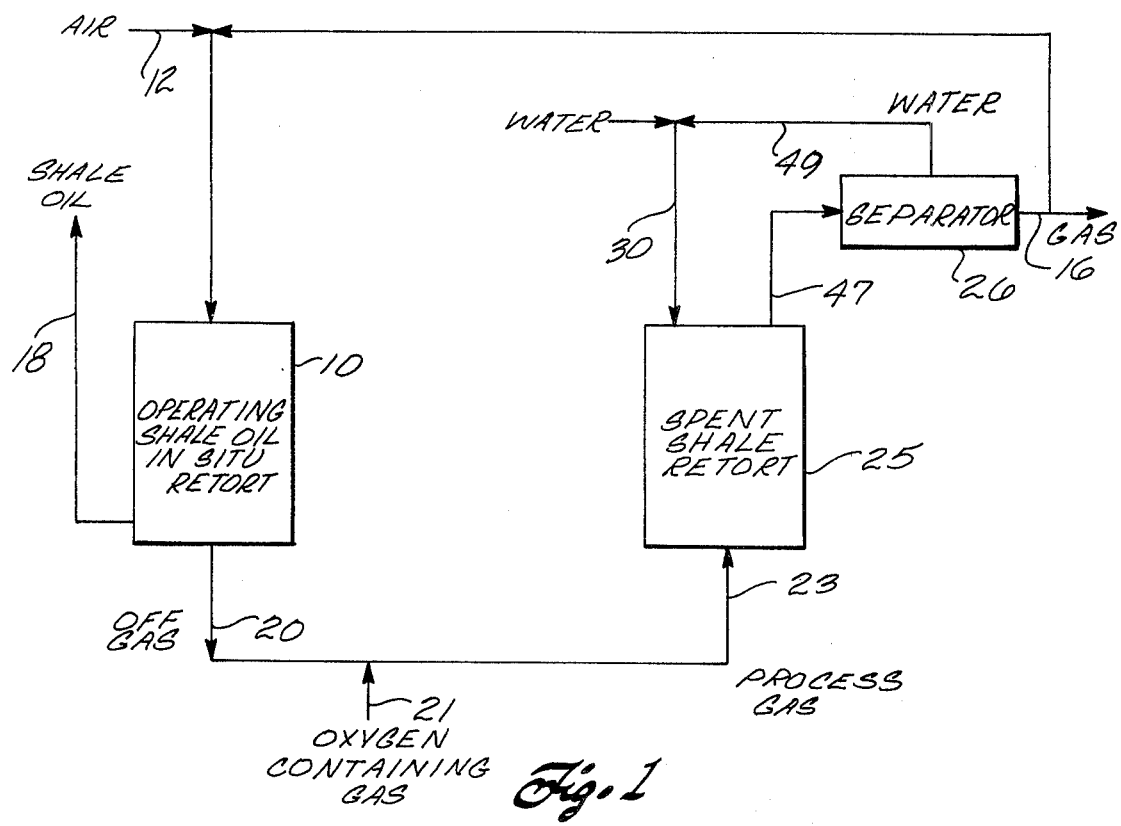

United States Patent [19]

Ridley

[11] 4,093,026

[45] June 6, 1978

[54] REMOVAL OF SULFUR DIOXIDE FROM PROCESS GAS USING TREATED OIL SHALE AND WATER

[75] Inventor: Richard D. Ridley, Grand Junction, Colo.

[73] Assignee: Occidental Oil Shale, Inc., Grand Junction, Colo.

[21] Appl. No.: 787,887

[22] Filed: Apr. 15, 1977

Related U.S. Application Data

[63] Continuation-in-part of Ser. No. 760,038, Jan. 17, 1977, abandoned, which is a continuation-in-part of Ser. No. 593,622, Jul. 7, 1975, abandoned, which is a continuation of Ser. No. 492,822, Jul. 29, 1974, abandoned.

[51] Int. Cl.² ............................................. E21B 43/24
[52] U.S. Cl. .................................. 166/256; 166/267; 208/11 R; 299/2; 423/244
[58] Field of Search ............... 166/256, 259, 265, 266, 166/267, 272, 302; 48/197 R; 208/11 R; 299/2; 423/242, 244

[56] References Cited

U.S. PATENT DOCUMENTS

| | | | |
|---|---|---|---|
| 2,550,432 | 4/1951 | Thompson | 208/11 R |
| 2,911,206 | 11/1959 | Purre | 166/272 |
| 3,086,853 | 4/1963 | Brandberg | 48/197 R |
| 3,384,569 | 5/1968 | Peet | 208/11 R |
| 3,454,958 | 7/1969 | Parker | 166/272 X |
| 3,460,620 | 8/1969 | Parker | 166/272 X |
| 3,460,867 | 8/1969 | Cameron et al. | 166/272 X |
| 3,499,489 | 3/1970 | Parker | 166/272 X |
| 3,548,938 | 12/1970 | Parker | 166/272 X |
| 3,551,093 | 12/1970 | Myers et al. | 423/244 |
| 3,578,080 | 5/1971 | Closmann | 166/259 |
| 3,586,377 | 6/1971 | Ellington | 166/272 X |
| 3,661,423 | 5/1972 | Garret | 299/2 |
| 3,703,052 | 11/1972 | Linden | 48/215 |
| 3,969,089 | 7/1976 | Moss et al. | 48/197 R |
| 3,976,747 | 8/1976 | Shale et al. | 423/244 |
| 4,003,823 | 1/1977 | Baird, Jr. et al. | 208/11 R X |
| 4,014,575 | 3/1977 | French et al. | 166/267 X |
| 4,016,239 | 4/1977 | Fenton | 208/11 R X |
| 4,036,299 | 7/1977 | Cha et al. | 166/259 X |

FOREIGN PATENT DOCUMENTS

1,183,937  11/1970  United Kingdom ............... 48/197 R

OTHER PUBLICATIONS

Riesenfeld et al., Gas Purification, (Gulf, 2nd Ed.), 1974, pp. 298–302.

Primary Examiner—Stephen J. Novosad
Assistant Examiner—George A. Suchfield
Attorney, Agent, or Firm—Christie, Parker & Hale

[57] ABSTRACT

Sulfur dioxide is removed from a process gas by passing the process gas through a fragmented permeable mass of particles containing treated oil shale and including alkaline earth oxides. Water in the fragmented mass combines with alkaline earth oxides in the fragmented mass and sulfur dioxide in the process gas with resultant removal of sulfur dioxide from the process gas.

21 Claims, 2 Drawing Figures

REMOVAL OF SULFUR DIOXIDE FROM PROCESS GAS USING TREATED OIL SHALE AND WATER

CROSS REFERENCES

The subject application is a continuation-in-part of application Ser. No. 760,038, filed Jan. 17, 1977, now abandoned the subject matter of which is incorporated herein by reference and which is a continuation-in-part of application Ser. No. 593,622 filed July 7, 1975, now abandoned, the subject matter of which is incorporated herein by reference and which is a continuation of application Ser. No. 492,822 filed July 29, 1974, now abandoned.

BACKGROUND OF THE INVENTION

The presence of large deposits of oil shale in the Rocky Mountain region of the United States has given rise to extensive efforts to develop methods of recovering shale oil from kerogen in the oil shale deposits. It should be noted that the term "oil shale" as used in the industry is in fact a misnomer; it is neither shale nor does it contain oil. It is a sedimentary formation comprising marlstone deposit interspersed with layers containing an organic polymer called "kerogen", which upon heating decomposes to produce carbonaceous liquid and gaseous products. It is the formation containing kerogen that is called "oil shale" herein, and the liquid carbonaceous product is called "shale oil".

A number of methods have been developed for processing the oil shale which involve either first mining the kerogen bearing formation containing oil shale and processing the oil shale on the surface, or processing the oil shale in situ. The latter approach is preferable from the standpoint of environmental impact since the spent shale remains in place, reducing the chance of surface contamination and the requirement for disposal of solid wastes.

The recovery of liquid and gaseous products from a subterranean formation containing oil shale has been described in several issued patents, one of which is U.S. Pat. No. 3,661,423, issued May 9, 1972, to Donald E. Garrett, the subject matter of which is incorporated herein by reference. This patent describes in situ recovery of liquid and gaseous carbonaceous materials from subterranean formations containing oil shale by excavating a portion of formation to form at least one void and explosively expanding and fragmenting a portion of the formation containing oil shale toward such a void to form a fragmented permeable mass of formation particles containing oil shale within the subterranean formation, referred to herein as an in situ oil shale retort. Hot retorting gases are passed through the in situ oil shale retort to convert kerogen contained in the oil shale to liquid and gaseous products.

One method of supplying the hot retorting gases used for converting kerogen contained in the oil shale, as described in the U.S. Pat. No. 3,661,423, includes the establishment of a combustion zone in the retort and the movement of an oxygen supplying gaseous feed mixture into the combustion zone to advance the combustion zone through the retort. In the combustion zone, oxygen in the gaseous feed mixture is depleted by reaction with hot carbonaceous materials to produce heat and a combustion gas. By the continued introduction of the oxygen supplying gaseous feed mixture into the combustion zone, the combustion zone is advanced through the retort.

The combustion gas and the portion of the gaseous feed mixture that does not take part in the combustion process pass through the retort on the advancing side of the combustion zone to heat the oil shale in a retorting zone to a temperature sufficient to produce kerogen decomposition, called retorting, in the oil shale to gaseous and liquid products and a residue of solid carbonaceous material.

The liquid products and gaseous products are cooled by the cooler oil shale particles in the retort on the advancing side of the retorting zone. The liquid carbonaceous products, together with water, are collected at the bottom of the retort. An off gas containing combustion gas generated in the combustion zone, gaseous products produced in the retorting zone, gas from carbonate decomposition, and gaseous feed mixture that does not take part in the combustion process is also withdrawn at the bottom of the retort.

The off gas, which contains nitrogen, hydrogen, carbon monoxide, carbon dioxide, water vapor, methane and other hydrocarbons, and sulfur compounds such as hydrogen sulfide, can be used as a fuel or otherwise disposed of but should be purged of the sulfur compounds before discharge into the environment. The sulfur compounds in the off gas are generated from naturally occurring sulfur compounds in oil shale deposits during the heating and combustion in the in situ oil shale retort. Unless removed, the sulfur compounds are oxidized to form sulfur dioxide when the off gas is oxidized. Sulfur dioxide is a pollutant and can combine with water to form $H_2SO_3$ and other polythionic acids which are toxic and corrosive.

While various processes for the removal of sulfur dioxide from gases such as off gas from oil shale retorting have been devised, most such known processes involve contacting the gas with an absorbing agent to convert the sulfur dioxide to a removable liquid or solid. The spent absorbing agent must then either be chemically regenerated or disposed of and replaced. Various absorption agents have been used, such as alkali metal carbonates, but the regeneration rate of these agents is low and the initial cost of many of these agents is too large to permit discharging of the spent agent. Water and limestone have been used as throwaway agents. Water systems have the disadvantage that they require cooling and heating of large quantities of gas and the resulting acidity of the water represents a disposal problem. Lime and limestone have been used as absorbents in both dry systems and wet systems. Since sulfur dioxide reacts more readily with lime, which is calcium oxide, then with limestone, which is principally calcium carbonate, calcination of the limestone is usually used. However, the reaction rate is still prohibitively low at reasonable temperatures so the gas is heated to temperatures above 1000° F to be effective. A large excess of lime or limestone is required because the resulting calcium sulfite forms on the particle surfaces, thereby quickly reducing the reaction rate with the coated lime or limestone particles.

Thus, there is a need for an economical process for removing sulfur compounds from the off gas from an in situ oil shale retort.

SUMMARY

According to the present invention, sulfur dioxide is removed from a process gas, such as oxidized off gas from oil shale retorting, by passing the process gas through a fragmented permeable mass of particles containing treated oil shale and including alkaline earth metal oxides. The fragmented permeable mass of particles can be in an in situ oil shale retort in a subterranean formation containing oil shale. The fragmented mass includes water, which can be provided by introducing water to the fragmented mass. The water combines with alkaline earth metal oxides in the fragmented mass and sulfur dioxide in the process gas.

Preferably the fragmented permeable mass contains a stoichiometric excess of alkaline earth metal oxides and/or hydroxides relative to the sulfur dioxide in the process gas when the process gas is passed through the fragmented permeable mass of particles to permit quick removal of the sulfur dioxide from the process gas and to insure that a high proportion of the sulfur dioxide is removed from the process gas.

The water in the fragmented mass can be introduced into the mass either alone, or it can be mixed with the process gas. Preferably water is removed from effluent gas from the fragmented mass and the removed water is recycled into the fragmented mass.

DRAWINGS

Figure 2:
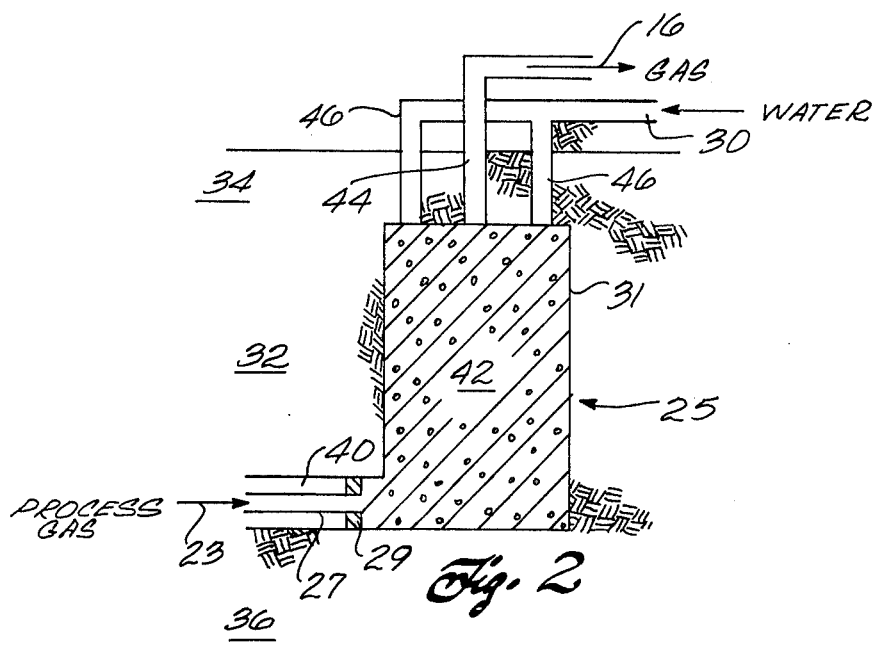

These and other features, aspects and advantages of the present invention will become more apparent when considered with respect to the following description of the invention, appended claims, and accompanying drawings, where:

FIG. 1 is a schematic block diagram of a process embodying features of this invention for retorting oil shale and using a spent retort for removing sulfur dioxide from a process gas obtained from retort off gas; and FIG. 2 schematically represents the use of a spent in situ oil shale retort for removing sulfur dioxide from process gas.

DESCRIPTION

The present invention is described in general terms with reference to FIG. 1. In FIG. 1, an in situ oil shale retort 10 is illustrated as being in an operational mode with shale oil 18 and an off gas stream 20 including gaseous products being withdrawn from the bottom of the retort 10. An active retort or retort in the operational mode is a retort containing a fragmented permeable mass of particles containing oil shale in which combustion and/or retorting of oil shale are being effected. Combustion and retorting are effected by introducing an oxygen supplying gaseous feed such as air 12 or air diluted to reduce its oxygen concentration into the retort for advancing combustion and retorting zones through a fragmented mass as hereinabove described. The off gas can contain large amounts of nitrogen with lesser amounts of hydrogen, carbon monoxide, carbon dioxide, methane, higher hydrocarbons, water vapor and sulfur compounds such as hydrogen sulfide. Oxidizable constituents in the off gas can be partially or totally oxidized to assure that sulfur compounds in the off gas are oxidized to sulfur dioxide. This can be effected by the addition of an oxygen containing gas 21 such as air to the off gas and reaction to yield a process gas 23 containing sulfur dioxide. The process gas 23 is shown in FIG. 1 as being introduced to the bottom of a spent in situ oil shale retort 25, containing a fragmented permeable mass containing treated or spent oil shale which has cooled below temperatures at which sulfur dioxide reacts with dry treated oil shale at any appreciable rate.

Suitable pumps or blowers (not shown) can be used to induce the desired flow rate of the process gas in the fragmented mass. The process gas 23 containing sulfur dioxide passes upwardly through the cold spent retort 25 and is withdrawn at the top. As indicated in FIG. 1, water is introduced through a line 30 to the top of the spent retort 25. The injection of water can be done simultaneously with or before passing process gas through the spent retort 25. The introduced water combines with alkaline earth metal oxides in the fragmented mass in the spent retort 25 and sulfur dioxide contained in the process gas introduced to the spent retort. Gas 47 withdrawn for the spent retort 25 can be passed through a separator 26 where water is removed from the gas. Removed water 49 can be reintroduced or recycled into the spent retort 25 for removal of sulfur dioxide in incoming process gas. A portion of the effluent gas 16 from the separator can be introduced to the active retort 10 as a portion of the oxygen supplying gaseous feed for diluting air to reduce its oxygen concentration.

The present invention is discussed in more detail with reference to FIG. 2. As shown schematically in FIG. 2, the spent in situ oil shale retort 25 is in the form of a cavity 31 formed in unfragmented subterranean formation 32 containing oil shale covered by an overburden 34 and underlayed by a rock base 36. The overburden and underlying rock can also contain oil shale.

The cavity 31 of the spent retort 25 contains an expanded or fragmented permeable mass 42 of formation particles containing treating oil shale and including alkaline earth oxides. A spent retort is a retort in which retorting and combustion of oil shale contained therein have been effected and retorting operations are completed. The cavity can be created simultaneously with fragmentation of the mass of formation particles by blasting by any of a variety of techniques. A method of forming an in situ oil shale retort is described in U.S. Pat. No. 3,661,423. A variety of other techniques also can be used such as those described in U.S. patent application Ser. Nos. 603,704, filed Aug. 11, 1975; 603,705, filed June 24, 1975, now U.S. Pat. Nos. 4,043,595; 659,899, filed Feb. 20, 1976, now U.S. Pat. No. 4,043,598; and 658,699, filed Feb. 17, 1976, now U.S. Pat. No. 4,043,597.

One or more conduits or ducts 44 communicate with the top of the fragmented mass of formation particles. During the retorting operation of the retort 25, a combustion zone is established in the retort 25 and advanced by introducing as a combustion zone feed a gaseous feed containing an oxygen supplying gas, such as air or air mixed with other gases, into the in situ oil shale retort through the conduits 44. As the gaseous feed is introduced to the retort 25, oxygen oxidizes carbonaceous material in the oil shale to produce combusted oil shale and combustion gas. Heat from the exothermic oxidation reactions carried by flowing gases advances the combustion zone downwardly through the fragmented mass of particles.

Combustion gas produced in the combustion zone and any unreacted portion of the oxygen supplying gaseous feed pass through the fragmented mass of particles on the advancing side of the combustion zone to establish a retorting zone on the advancing side of the combustion zone. Kerogen in the oil shale is retorted in the retorting zone to produce liquid and gaseous products. A carbonaceous residue is left upon thermal decomposition of the kerogen. Such carbonaceous material can burn in the combustion zone to provide heat for retorting.

There is an access drift, adit, tunnel 40 or the like in communication with the bottom of the retort. The drift can contain a sump (not shown) in which liquid products are collected to be withdrawn for further processing. An off gas containing gaseous products, combustion gas, gas from carbonate decomposition, and any unreacted portion of the oxygen supplying gaseous feed is also withdrawn from the in situ oil shale retort 25 by way of the drift 40 via a conduit such as a pipe 27 extending through a bulkhead 29. The off gas can contain large amounts of nitrogen with lesser amounts of hydrogen, carbon monoxide, carbon dioxide, methane and higher hydrocarbons, water vapor, and sulfur compounds such as hydrogen sulfide. It is desirable to remove at least a portion of the sulfur compounds from the off gas so the off gas can be used as fuel gas for power generation in a work engine such as a gas turbine, or if the off gas is flared, to limit sulfurous emission.

At the end of retorting operations at least part of the oil shale in the retort 25 is at an elevated temperature which can be in excess of 1000° F. The hottest region of an in situ retort is often near the bottom, and a somewhat cooler region is at the top due to continual cooling by gaseous feed during retorting and conduction of heat to adjacent shale. The oil shale in the retort gradually cools toward ambient temperature when retorting and combustion are complete. In the illustrated embodiment, the spent retort 25 is cooler than it was at the completion of combustion and retorting due to lapse of time after active retorting and/or introduction of water or cooling gases.

The spent retort 25 illustrated in FIG. 2 has had retorting and combustion operations completed and contains a fragmented permeable mass of formation particles containing combusted oil shale. As used herein, the term "retorted oil shale" refers to oil shale heated to a sufficient temperature to decompose kerogen in an environment substantially free of free oxygen so as to leave a solid carbonaceous residue. The term "combusted oil shale" refers to oil shale of reduced carbon content due to oxidation by a gas containing free oxygen. The term "treated oil shale" refers to oil shale treated to remove organic materials and includes retorted and/or combusted oil shale. An individual particle containing oil shale can have a core of retorted oil shale and an outer "shell" of combusted oil shale. Such can occur when oxygen has diffused only part way through the particle during the time it is at an elevated temperature and in contact with an oxygen supplying gas.

Oil shale contains large quantities of alkaline earth metal carbonates, principally calcium and magnesium carbonates which during retorting and combustion are at least partly calcined to produce alkaline earth metal oxides. Thus, combusted oil shale particles in the retort 25 can contain approximately 20 to 30% calcium oxide and 5 to 10% magnesium oxide, with smaller quantities of less reactive oxides present.

When it is desired to remove sulfur compounds from off gas from an active in situ retort, the off gas can be partially or totally oxidized to assure that sulfur compounds are oxidized to sulfur dioxide.

Referring to FIG. 2, a process gas stream 23 containing sulfur dioxide, such as oxidized off gas from the active oil shale retort 10, is introduced through the pipe 27 to the spent retort 25. There is sufficient differential pressure between the top and bottom of the spent retort 25 to cause the process gas to flow through the pipe 27, which is in communication with the bottom of the spent retort 25, and upwardly through the fragmented mass and through the ducts 44, which are in communication with the upper boundary of the fragmented mass of particles containing treated oil shale in the retort 25. For economy, the ducts 44 used for introducing oxygen supplying gaseous feed to the retort 25 during the retorting operation are utilized to withdraw a purified effluent gas 16 from the retort. Similarly, the pipe 27 used for withdrawing off gas from the retort during the retorting operation is utilized for introducing the process gas stream 23 to the retort. Alternatively, the sulfur dioxide containing gas can be introduced to the retort 25 through the ducts 44 at the top and the purified effluent gas 16 can be withdrawn from the retort 25 via the pipe 27 at the bottom. The effluent gas 16 has a sulfur dioxide and total surface concentration relatively lower than the sulfur dioxide and total sulfur concentration of the process gas 23 introduced into the retort 25.

As the process gas containing sulfur dioxide passes through the spent retort 25, sulfur dioxide present in the gas combines with the oxides of calcium and/or magnesium to form calcium and magnesium sulfites. Exemplary of the reactions which occur is the following reaction:

$$MO + SO_2 \rightarrow MSO_3 \tag{1}$$

where M represents an alkaline earth metal. Any water present in the spent retort is expected to enhance the rate or completeness of reaction of sulfur dioxide with alkaline earth metal oxides. Thus a substantial portion of the sulfur dioxide can be removed from the gas passing through the retort, especially at high temperatures of the mass of particles in the retort and at high molar ratios of alkaline earth metal oxides to sulfur dioxide. Therefore, when an oil shale retort containing treated oil shale is used the sulfur dioxide and the total concentration of sulfur compounds in the process gas stream can be reduced.

While the direct reaction between sulfur dioxide and calcium or magnesium oxide to form the sulfite occurs slowly at ambient temperature, at temperatures above about 1000° F short reaction times occur. At temperatures from about 500° F to about 1000° F the reaction proceeds to completion, but more slowly. At temperatures below about 450° F to 500° F, the flow rate of the gas can be too great and residence time in the retort too low for effective removal of sulfur dioxide in the retort 25. According to the present invention, cooled treated shale is used to remove sulfur dioxide by injecting water into the treated shale to provide reactions which occur at reasonable rates down to about ambient temperatures.

Sulfur dioxide is removed from process gas 24 by passing the process gas through the spent shale retort 25. The fragmented permeable mass 42 of formation particles containing treated oil shale in the retort 25 includes water, and the water combines with alkaline earth metal oxides in the spent retort 25 and sulfur dioxide in the process gas 23 with resultant removal of the sulfur dioxide from the process gas.

It is believed that removal of sulfur dioxide from the process gas occurs according to the following reactions as described in the book, *Gas Purification*, by Riesenfeld and Kohl, (Gulf Pub. Co., 2nd Ed., 1974) pages 298-302:

$$MO + H_2O \rightarrow M(OH)_2 \quad (2)$$
$$SO_2 + H_2O \rightarrow H_2SO_3 \quad (3)$$
$$M(OH)_2 + H_2SO_3 \rightarrow MSO_3 + 2H_2O \quad (4)$$

where M represents an alkaline earth metal.

The resulting alkaline earth metal sulfite, which can be hydrated, is deposited as an insoluble material on the surface of the treated shale particles. However, since there is a very large stoichiometric excess of alkaine earth metal oxides to the sulfur dioxide, a single spent in situ retort can be used to scrub product gas from many operating retorts before the water promoted reactions become ineffective in removing sulfur dioxide from the gas.

While the above-described process makes use of oil shale retorted in situ, the process of sulfur dioxide removal can also utilize treated shale from above ground retorting. The former is preferred, however, for a variety of reasons. Fragmented shale in an in situ retort generally has a larger particle size than treated shale from above ground retorting. The volume of shale through which gas can be passed in an in situ retort is quite large. This permits substantial residence time of the gas in contact with the reactants so that complete reaction occurs and permits treatment of large volumes of gas without high gas flow resistance that increases gas pumping energy costs. The permanent location of the treated shale in situ eliminates problems of disposing of reaction products or excess water. Scrubbing in an in situ retort also avoids costs in building and maintaining reaction vessels. It is apparent that the process gas being scrubbed can be from an above ground active retort rather than an active in situ retort.

Because of combination of sulfur dioxide in the gas introduced to the retort 25 with water and alkaline earth metal oxides present in the retort, the sulfur dioxide concentration and total sulfur concentration of the process gas 25 are reduced. Therefore a purified gas stream 16 having a lower sulfur dioxide concentration and a lower total sulfur concentration than the sulfur dioxide concentration and total sulfur concentration of the process gas stream 23 is withdrawn from the retort 25 via the output duct 44.

The water required for combination with sulfur dioxide and alkaline earth metal oxides in the spent retort 25 can be provided by any suitable method such as by mixing steam or a mist of atomized water with the sulfur dioxide containing process gas 23 prior to introducing the gas into the retort. Alternatively, as shown in FIGS. 1 and 2, the water can be introduced into the retort 25 separately from the sulfur dioxide containing gas via a water injection line 30. The water injection line 30 is connected to a plurality of pipes 46 extending down to the top of the fragmented permeable mass in the in situ retort 25. The water can be injected through the pipes 46 into the top of the retort 25 in the form of a fine stream, a spray, a mist or steam. The water can be introduced into the spent retort 25 at the same time as or prior to introduction of the sulfur dioxide containing gas to the spent retort 25.

The water introduced into the retort 25 can be obtained from water collected in the sump of an active retort, waste process water, and/or water from the separator 16. An advantage of using water obtained from the separator 16 is conservation of water, which is a valuable commodity in the Western United States, where the bulk of domestic oil shale reserves are found.

It is desirable to introduce water at the top of the in situ retort 25 so that quantities of water in excess of that needed to wet the treated shale at the top percolate downwardly to wet additional treated shale. If desired, water can also be added at lower levels in the fragmented treated shale by drilling through the fragmented mass and placing pipes.

When the temperature of oil shale in the retort 25 is lower than about 580° C (1076° F), the decomposition temperature of calcium hydroxide, water introduced into the retort can react with calcium oxide to produce calcium hydroxide. Therefore, preferably the temperature of the fragmented mass in the cold spent retort is less than about 580° C, and more preferably, less than about 350° C (662° F), the decomposition temperature of magnesium hydroxide, so magnesium hydroxide is available for reaction (4). When the temperature of the fragmented permeable mass in the spent retort 25 is lower than the boiling temperature of water, water added to the top of the retort 25 can percolate downwardly through the retort as liquid water and combine with alkaline earth metal oxides in the retort.

At least a portion of the alkaline earth metal oxides in the spent retort 25 can be hydrated to the corresponding alkaline earth metal hydroxides.

Preferably there is a large stoichiometric excess of alkaline earth metal oxides and/or hydroxides in the particles containing treated oil shale in the spent retort 25 relative to the sulfur dioxide in the process gas introduced to the retort. However, as the treated oil shale in the retort is used to remove sulfur dioxide, the amount of alkaline earth metal oxides and/or hydroxides available for removing sulfur dioxide decreases. In addition, calcium sulfite precipitates on the surface of the formation particles and reduces the efficiency of sulfur dioxide removal. When there is no longer a stoichiometric excess of alkaline earth metal oxides and/or hydroxides relative to the sulfur dioxide, the sulfur dioxide containing process gas can be diverted to another spent retort containing formation particles containing oil shale treated to remove organic material.

Generally, sufficient alkaline earth metal oxides and/or hydroxides are present in a retort to remove at least a substantial portion of the sulfur dioxide formed from oxidation of hydrogen sulfide in off gas generated from retorting oil shale in a retort of comparable size. For example, retorting one ton of formation particles containing oil shale can yield about 750 pounds of alkaline earth metal oxides and/or hydroxides and about 18,000 standard cubic feet of off gas containing up to about 0.17% by weight of hydrogen sulfide. Thus, for each mole of hydrogen sulfide produced in a retort, there are available over 300 moles of alkaline earth metal oxides and/or hydroxides in the treated oil shale to remove sulfur dioxide formed from oxidation of the hydrogen sulfide. Thus when removing hydrogen sulfide from off gas generated during oil shale retorting, a large stoichiometric excess of alkaline earth metal oxides and/or hydroxides are available. Therefore, the presence of precipitated calcium sulfite on the surface of formation particles has only a limited effect on removal of sulfur dioxide and at least the major part of the sulfur dioxide in oxidized off gas from an active in situ retort can be removed with treated oil shale according to principles of this invention.

Preferably the sulfur dioxide containing process gas is introduced to the warmest portion of the fragmented permeable mass in the spent retort 25 to minimize pressure drop through the retort and the cost of passing gas through the retort. By introducing the gas to the warmest portion of the retort 25, heat is transferred by flowing gas to the cooler portions of the retort, with the result that the fragmented permeable mass eventually has a substantially uniform temperature gradient, with the temperature decreasing in the direction of movement of the gas. This results in reduced pressure drop across the retort because the volumetric flow rate of gas through the retort 25 decreases as the temperature of the fragmented mass decreases. Also the void fraction of the fragmented permeable mass increases due to thermal contraction of the formation particles as the mass of particles cools. Thus, the cross sectional area available for flow of gas through the retort increases.

Therefore, as shown in FIG. 2, when a fragmented permeable mass in an in situ oil shale retort is retorted from top to bottom, preferably the sulfur dioxide containing gas is introduced to the bottom of the retort, and purified effluent gas is withdrawn from the top of the retort. An additional advantage of introducing the gas to the bottom of the retort, as shown in FIG. 2 is that off gas from the bottom of an adjacent active retort can be directly introduced to the bottom of the spent retort 25 without having to incur the capital and operating expenses of transferring the off gas to the top of the spent retort.

The method of this invention has many advantages over prior art processes described above. By utilizing treated oil shale the purchase of an absorbent such as lime or limestone is avoided. The cost of calcining limestone and grinding and injecting absorbent into the gas stream also is avoided. Furthermore, treated oil shale used as an absorbent remains in the ground, thereby eliminating disposal problems. In addition, a large stoichiometric excess of treated oil shale is available. The regeneration of treated oil shale used as an absorbent is unnecessary even if its activity is greatly reduced by poisoning. A long residence time of the sulfur dioxide containing gas stream in the retort can be utilized. Because of the stoichiometric excess of treated oil shale, a surface coating of sulfites on the retorted oil shale particles has minimal effect on removal of sulfur dioxide.

U.S. patent application Ser. No. 760,038 entitled "Two-Stage Removal of Sulfur Dioxide from Process Gas Using Oil Shale", filed Jan. 17, 1977, by Richard D. Ridley and Chang Yul Cha and assigned to the same assignee as the present application describes a process wherein sulfur dioxide is removed from process gas by contacting treated oil shale. In that process, the process gas is first passed through a volume of treated oil shale in an in situ retort wherein the treated oil shale has a temperature greater than about 500° F in accordance with a process as set forth in patent application Ser. No. 728,421 entitled "Removing Sulfur Dioxide from Gas Streams with Retorted oil Shale", filed Sept. 30, 1976, by Richard D. Ridley and assigned to the same assignee as the present application. Thereafter, the gas is passed through a volume of treated oil shale that is relatively cool with addition of water as described in practice of this invention. That is, application Ser. No. 760,038 is directed to a combination of this process and the process in application Ser. No. 728,421 wherein gas is passed sequentially through relatively hot treated oil shale and then through relatively cool treated oil shale with added water.

Although the invention has been described in considerable detail with reference to certain versions thereof, other versions of the invention are possible. Therefore, the spirit and scope of the appended claims should not necessarily be limited to the description of the versions contained herein.

What is claimed is:

1. A method for recovering gaseous products from a first in situ oil shale retort in a subterranean formation containing oil shale, said first in situ retort containing a fragmented permeable mass of particles containing oil shale and having a combustion zone and a retorting zone advancing therethrough, the method comprising the steps of:

(a) introducing into the first in situ oil shale retort on the trailing side of the combustion zone a combustion zone feed comprising oxygen to advance the combustion zone through the fragmented mass of particles and produce combustion gas in the combustion zone;

(b) passing said combustion gas and any unreacted portion of the combustion zone feed through a retorting zone in the fragmented mass of particles on the advancing side of the combustion zone, wherein oil shale is retorted and gaseous products are produced;

(c) withdrawing a retort off gas comprising said gaseous products, combustion gas and any gaseous unreacted portions of the combustion zone feed from the first in situ oil shale retort from the advancing side of the retorting zone;

(d) oxidizing hydrogen sulfide in the retort off gas to sulfur dioxide;

(e) reducing the sulfur dioxide and total sulfur concentration of oxidized retort off gas from the first retort by the steps of:

(i) during a first period of time introducing a gaseous combustion zone feed containing oxygen into a combustion zone in a second in situ oil shale retort in a subterranean formation containing oil shale and including alkaline earth metal carbonates, said second in situ retort containing a fragmented permeable mass of formation particles containing oil shale and including alkaline earth metal carbonates, wherein the gaseous combustion zone feed advances the combustion zone through the fragmented mass of particles and converts at least a portion of the alkaline earth metal carbonates to alkaline earth metal oxides and produces combusted oil shale particles; and thereafter during a second period of time (ii) introducing water into the second retort; and (iii) introducing at least a portion of the oxidized retort off gas from the first retort to the second retort for combining water introduced to the second retort with alkaline earth metal oxides in the second retort and sulfur dioxide in oxidized retort off gas from the first retort for removal of sulfur dioxide from oxidized retort off gas from the first retort to yield gas with a sulfur dioxide and total sulfur concentration that is relatively lower than the sulfur dioxide and total sulfur concentration of the oxidized retort off gas, and withdrawing such gas with relatively lower sulfur dioxide and total sulfur concentration from the second retort.

2. A method for removing sulfur dioxide from a process gas comprising the steps of:
passing a process gas containing sulfur dioxide through a fragmented permeable mass of particles containing treated oil shale and including alkaline earth metal oxides, said mass including water for combining with alkaline earth metal oxides in the fragmented mass and sulfur dioxide in the process gas for removal of sulfur dioxide from the process gas.

3. The method of claim 2 wherein the fragmented mass has a temperature less than the decomposition temperature of calcium hydroxide when the process gas is passed therethrough.

4. The method of claim 2 wherein the fragmented mass has a temperature less than the decomposition temperature of magnesium hydroxide when process gas is passed therethrough.

5. The method of claim 2 wherein the fragmented mass has a temperature less than about 500° F when process gas is passed therethrough.

6. The method of claim 2 wherein the fragmented permeable mass of particles contains combusted oil shale.

7. A method for removing sulfur dioxide from gas from oil shale retorting comprising the steps of:
introducing water into a fragmented permeable mass of particles containing treated oil shale and including alkaline earth metal oxides, the mass of particles having a top and a bottom;
introducing gas from oil shale retorting containing sulfur dioxide to the fragmented mass for combining sulfur dioxide in the gas from oil shale retorting with alkaline earth metal oxides and water in the fragmented mass for removal of sulfur dioxide from gas from oil shale retorting; and
withdrawing gas from the fragmented mass.

8. The method of claim 7 wherein gas from oil shale retorting is introduced to the bottom of the fragmented mass of particles and gas is withdrawn from the top of the fragmented mass.

9. The method of claim 8 wherein water is introduced into the top of the fragmented mass of particles.

10. The method of claim 7 wherein at least a portion of the fragmented mass has a temperature less than about 500° F when the gas from oil shale retorting is introduced thereto.

11. The method of claim 7 wherein the gas withdrawn from the fragmented mass contains water comprising the additional steps of:
removing water from gas withdrawn from the fragmented mass; and
introducing the removed water to the fragmented mass.

12. A method for removing sulfur dioxide from a process gas resulting from oil shale retorting comprising the steps of:
introducing water to an in situ oil shale retort in a subterranean formation containing oil shale, the in situ retort having a top and bottom and containing an explosively expanded and fragmented permeable mass of particles containing treated oil shale and including alkaline earth metal oxides;
introducing a process gas resulting from oil shale retorting containing sulfur dioxide to the in situ oil shale retort for combining sulfur dioxide in the process gas with alkaline earth metal oxides and water in the in situ oil shale retort for removal of sulfur dioxide from the process gas to yield a gas of relatively lower sulfur dioxide concentration than the sulfur dioxide concentration of the process gas; and
withdrawing such gas of relatively lower sulfur dioxide concentration from the in situ oil shale retort.

13. The method of claim 12 wherein the in situ oil shale retort contains a stoichiometric excess of alkaline earth metal oxides and/or hydroxides relative to the sulfur dioxide in the process gas when the process gas is introduced to the in situ retort.

14. The method of claim 12 wherein process gas resulting from oil shale retorting is introduced to the bottom of the in situ oil shale retort and gas of relatively lower sulfur dioxide concentration than the sulfur dioxide concentration of the process gas is withdrawn from the top of the in situ oil shale retort.

15. The method of claim 14 wherein water is introduced to the top of the in situ oil shale retort.

16. The method of claim 12 in which the step of introducing water to the retort comprises mixing water with process gas.

17. A method for removing sulfur dioxide from a process gas comprising the steps of:
mixing water with a process gas containing sulfur dioxide, and
introducing the mixed water and process gas to a fragmented permeable mass of particles containing treated oil shale and including alkaline earth metal oxides for combining sulfur dioxide in the process gas and water with alkaline earth metal oxides in the fragmented mass for removal of sulfur dioxide from the process gas.

18. The method of claim 17 in which the step of mixing comprises mixing process gas with steam.

19. The method of claim 17 in which the step of mixing comprises mixing process gas with a spray of water.

20. The method of claim 17 wherein the fragmented mass has a temperature less than about 580° C when process gas is introduced thereto.

21. The method of claim 17 wherein the fragmented permeable mass of particles contains combusted oil shale.

* * * * *